March 15, 1927. 1,621,418
D. W. KOEHN
HITCH
Filed March 19, 1926 2 Sheets-Sheet 1
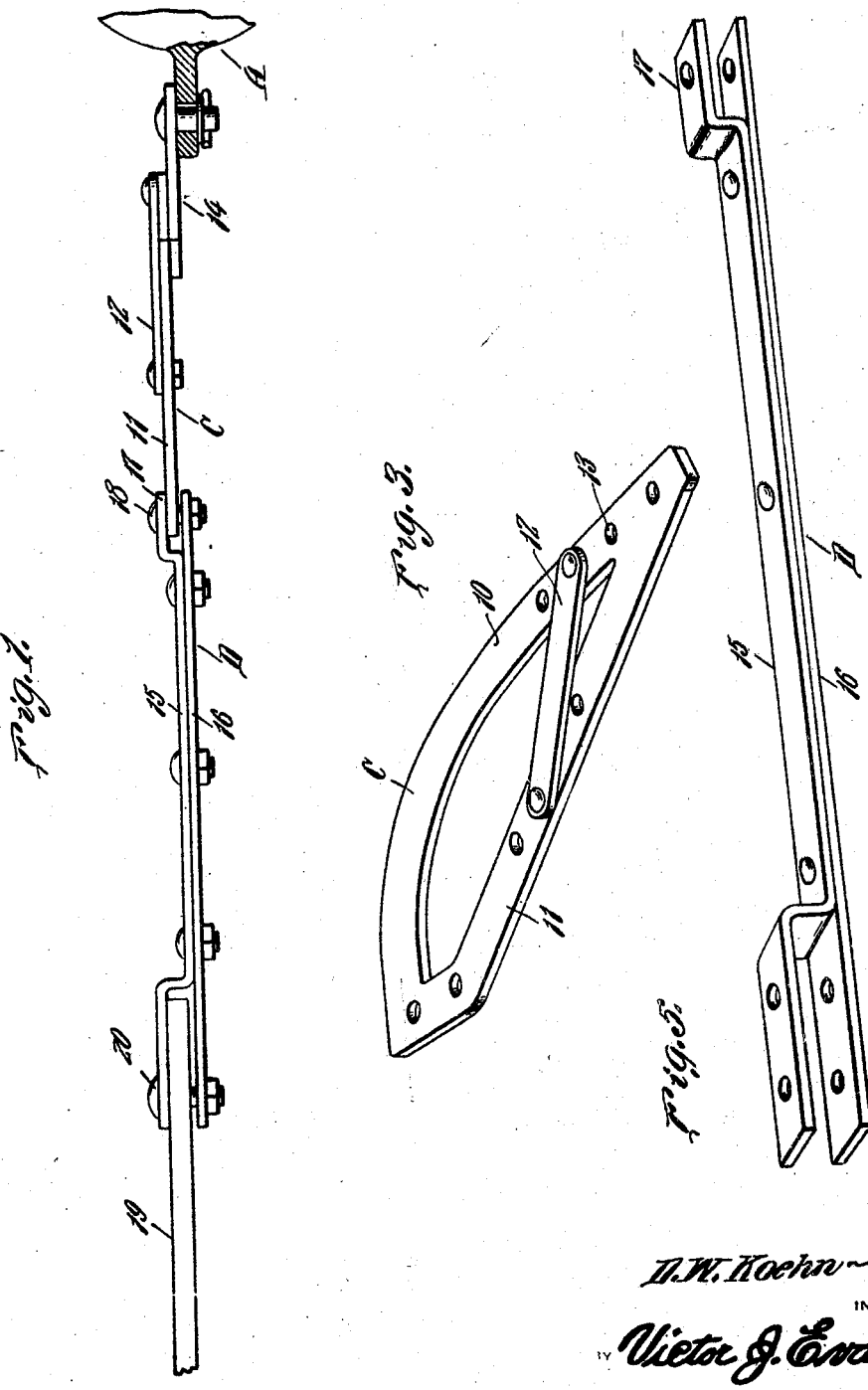
D. W. Koehn
INVENTOR
Victor J. Evans
ATTORNEY

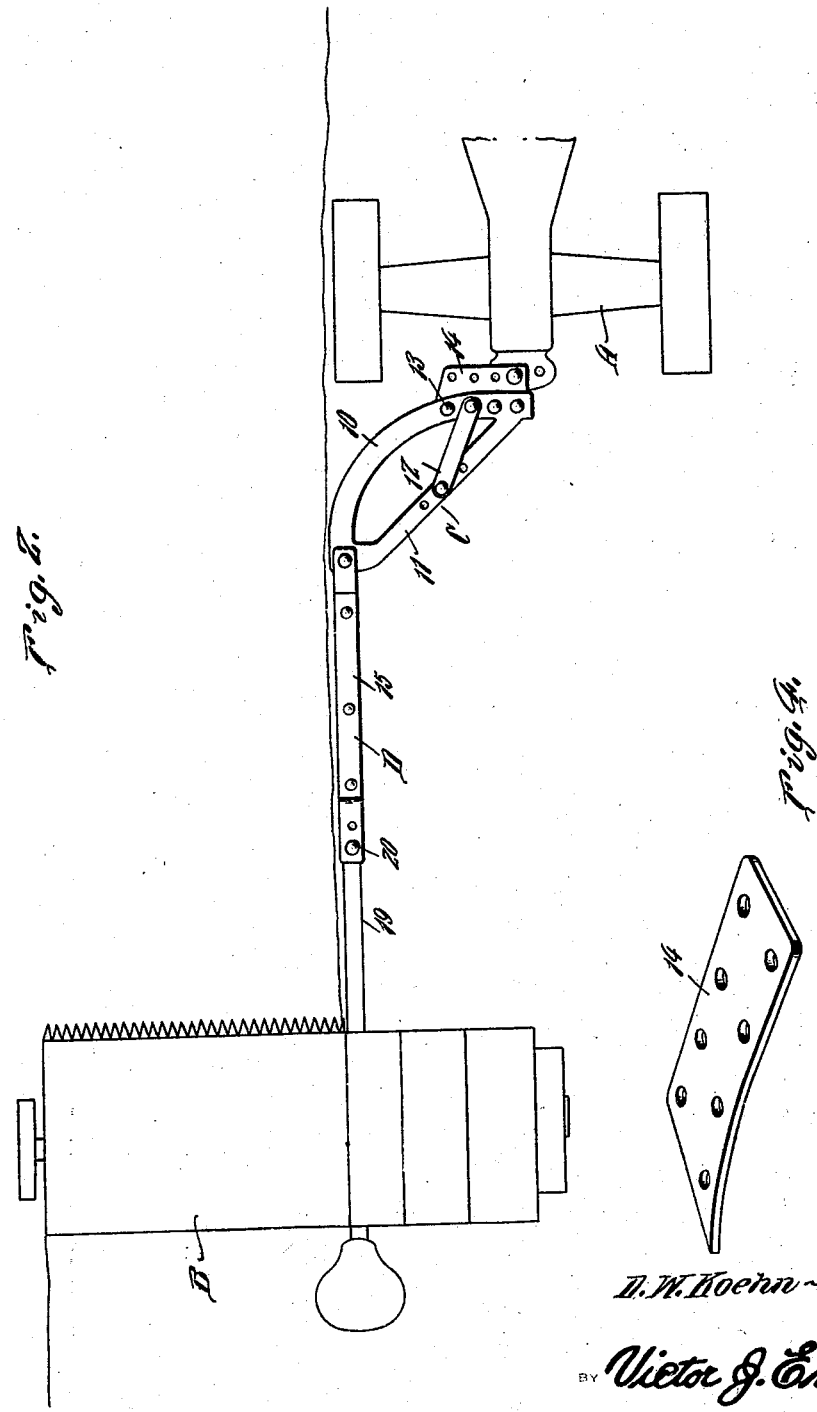

Patented Mar. 15, 1927.

1,621,418

UNITED STATES PATENT OFFICE.

DANIEL W. KOEHN, OF GALVA, KANSAS, ASSIGNOR OF ONE-THIRD TO GUSTAVE G. DIXON, OF GALVA, KANSAS, AND ONE-THIRD TO HARRY G. ROLF, OF McPHERSON, KANSAS.

HITCH.

Application filed March 19, 1926. Serial No. 96,012.

The object of this invention is to provide a tractor hitch which can be quickly and conveniently attached to the tractor and the machine or other implement to be drawn thereby, and removed from said parts when desired, without the necessity of removing the stub tongue of the machine with which the tractor is to be coupled.

Another object of the invention resides in providing a tractor with a hitch which is designed to practically eliminate all side draft, and to simplify the construction of a device of this character generally, so that the manufacturing and selling cost can be reduced to a minimum.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation showing the manner in which the tractor is coupled to a machine to be drawn thereby.

Figure 2 is a top plan view.

Figure 3 is a detail view of the hitch proper.

Figure 4 is a view of the removable plate thereof.

Figure 5 is a view in elevation of the draw bar, adapted to be associated with the hitch.

Referring to the drawings in detail, A indicates a portion of a tractor of any well known construction, while B represents a portion of the machine to be drawn by the tractor, these parts being coupled together by means of the hitch forming the subject matter of the present invention. The invention is primarily intended to be used for the purpose of coupling a wheat binder to a tractor, although it is to be understood that its general application is contemplated by the claims, and that it can be used to couple any other machine or agricultural implement with the tractor where its use would be found advantageous.

The hitch proper is indicated generally at C, and embodies an arcuate shaped member 10, the ends of which are connected by a diagonally disposed strip 11, which preferably forms an integral part of the hitch. This strip 11 is also connected at an appropriate point in its length to one end of an additional bracing element 12 which projects from the inner edge of the arcuate shaped member 10. This element 12 preferably forms an integral part of the hitch proper, so that the hitch in its entirety consists of a single frame like member C of the configuration shown and described. The arcuate shaped member 10 of the hitch is provided with a plurality of openings 13 adjacent one end thereof, so that an attaching plate 14 can be easily attached to or detached from the hitch proper as the occasion requires. The use of this plate 14 depends upon the particular make or type of tractor, inasmuch as some types of tractors would necessitate the use of the plate 14, while with other types its use could be dispensed with. If the plate 14 is used, it is directly connected with the tractor as shown in the drawing, the plate being provided with openings for this purpose. If the plate 14 is not used, the arcuate shaped member 10 of the hitch proper is then connected with the tractor, and the fastening elements used for this purpose passed through the openings 13.

In conjunction with the frame like member just described I make use of what I term a draw bar indicated generally at D and which bar is made up of two parts 15 and 16 respectively. These parts are arranged in superimposed relation, with the terminals of the part 15 offset as shown to allow the bar to be conveniently attached to the hitch C and also to the machine B. The opposed end of the hitch C is provided with openings 17 which register with openings in the component parts of the draw bar at one end thereof to receive fastening bolts 18, it being of course understood that this end of the hitch is received by the space between the component parts of the draw bar which is provided by offsetting the ends of the part 15 thereof. The other end of the draw bar receives the stub tongue 19 of the wheat binder or other machine which is to be coupled to the tractor, and the connection between these parts is made by the use of suitable bolts 20. It is of course necessary to bore holes in the stub tongue of the machine in order to receive the fastening bolts 20 just referred to. However the construction of the invention is very superior to any other tractor hitch with which I am familiar, because it can be quickly and conveniently attached to both the tractor and the machine to be drawn thereby, without the necessity of removing the stub tongue of the machine as is frequently required by hitches in present day use. The operator can also turn to either the right or to the left, and it can also be used with either a right or left hand cut binder. When the invention is used with other machines than a wheat binder, the hitch C can be detached from the draw bar and either part used with the other machine, whichever would seem to be the most convenient. The component parts of the invention may be constructed from any suitable material, and may also vary in size without departing from the spirit of the invention. Then again, the hitch is designed to keep the tractor far enough away from the wheat to provide the proper clearance, and to prevent the wheat from catching under the tractor wheel. The entire device is very simple in construction and can be manufactured and sold at a nominal cost.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A tractor hitch comprising a frame like member including a curved body portion adapted to be attached to the tractor, an integral strip connecting the terminals of said body portion, a bracing element projecting from said body portion and connected with said strip at an appropriate point in its length, and a draw bar connected with one end of the body portion and adapted to be coupled to the object to be drawn by the tractor.

2. A tractor hitch comprising a frame like member including an arcuate shaped body portion having a plurality of openings adjacent one end, an attaching plate having openings adapted to register with certain of said openings of the body portion, fastening elements passed through said registering openings and detachably connecting a plate with the body portion whereby either the plate or said body portion can be directly connected with the tractor, and a draw bar connected with the other end of said body portion and adapted to be coupled with the object to be drawn by the tractor.

In testimony whereof I affix my signature.

DANIEL W. KOEHN.